INVENTOR.
GEORGE T. SHIMABUKURO
BY
Christie, Parker & Hale
ATTORNEYS.

INVENTOR.
GEORGE T. SHIMABUKURO
BY
Christie, Parker & Hale
ATTORNEYS.

INVENTOR.
GEORGE T. SHIMABUKURO
BY
Christie, Parker & Hale
ATTORNEYS.

United States Patent Office 3,428,944
Patented Feb. 18, 1969

3,428,944

ERROR CORRECTION BY RETRANSMISSION

George T. Shimabukuro, Monterey Park, Calif., assignor to Burroughs Corporation, Detroit, Mich., a corporation of Michigan Filed Mar. 8, 1965, Ser. No. 437,779
U.S. Cl. 340—146.1 10 Claims
Int. Cl. G08b *29/00;* G06f *11/08*

ABSTRACT OF THE DISCLOSURE

A system for correcting transmission errors appearing in digital information in which characters of a message being transmitted are checked for errors at the recording end and are stored, as transmitted, in a memory if no error is detected. Circuit means, responsive to detection of an error, effects the storage of a particular character designated a "trap character" in the memory at the location provided for the erroneous character. Upon retransmission of the message, a retransmitted character is stored in memory responsive to both a determination that it has been correctly transmitted and a determination that a "trap character" is stored in the memory at the location provided for the particular character. A complete error-free message will accordingly be stored in the memory so long as each character of the message is correctly received at least once during the initial transmission and subsequent retransmissions of the message.

Figure 1:
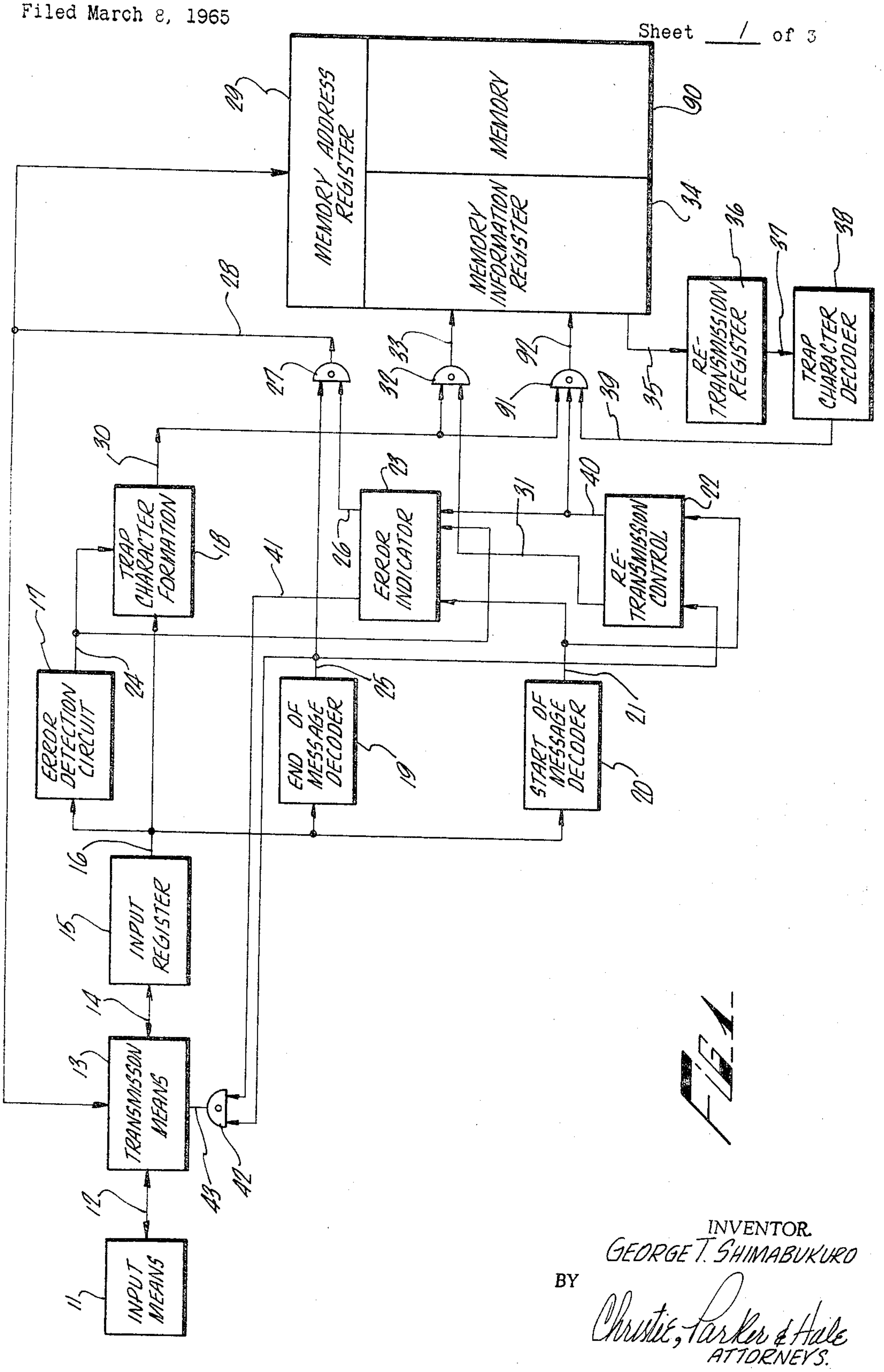

This invention relates to the transmission of information in digital form and, more particularly, to a method of correcting errors in such transmission by means of retransmission of the information and apparatus for implementing the method.

When digital information is transmitted between widely separated transmitting and receiving units, it is not uncommon for errors to appear in the transmitted information. Such errors can arise as a result of a number of factors such as, for example, the length of transmission, atmospheric conditions, or the condition of the transmission line. Error correction by retransmission has heretofore been utilized in such arrangements by means of repeated retransmissions of a message, upon detection of an error in the message received, until a single error-free transmission is received. Thus, any error in a retransmitted message requires a subsequent retransmission of the message. Error correction by this method, however, is not suitable for transmissions in which errors occur at a fairly high frequency. In such transmissions, the probability of a single transmission being error-free may be quite small and consequently each message may have to be retransmitted a considerable number of times before a single error-free transmission occurs.

The present invention represents an improved method of error correction by retransmission and apparatus for carrying out the improved method.

The present invention may advantageously be employed in either simplex or duplex type transmission systems. In duplex systems information may be transmitted in two directions while in simplex systems only unidirectional transmission is possible. When adapted to a duplex system, the present invention may be utilized to signal the transmitting unit upon completion of the initial transmission of a message that an error has occurred and that the message should be retransmitted. Subsequent signals calling for additional retransmissions will, in accordance with the present invention, be sent to the transmitting unit only upon receipt of an erroneous character which has not been correctly received during any previous transmission. As a result, the present invention is able to provide a receiving unit with a complete error-free message after a fewer number of retransmissions than would be required by prior art methods of error correction employing retransmission. Upon receipt of an error-free message by the receiving unit, the transmitting unit may automatically proceed with the initial transmission of a succeeding message.

The present invention may also be advantageously employed in simplex transmission systems wherein the automatic retransmission of each message a predetermined number of times is utilized to assure a high probability that the receiving unit will contain an error-free message after the last retransmission. The number of retransmissions for a particular system will depend upon noise in the system and the traffic volume. If all characters of the message have been correctly received prior to the last retransmission, the receiving unit may be disconnected from the transmitting unit and, if so desired, connected to another transmitting unit.

Another advantage of the present invention when utilized in a simplex system is that unavoidable transmission errors in a transmitted message may be identified by a data processor subsequently using this message as having occurred during transmission. Thus, if the number of retransmissions is insufficient to correct an erroneous character in a particular message position, a particular "trap character" is inserted in a memory address associated with this message position, according to the present invention, thereafter indicating that the erroneous character in this position is present as a result of faulty transmission. Subsequent error detection apparatus in the data processor will thereby be able to identify the source of this particular error.

The preceding and other advantages of the present invention are achieved by means of a data transmission system in which characters of a message being transmitted are checked for error at the recording end. The characters are stored, as transmitted, in a memory circuit if no error is detected. If an error is detected, however, a particular character designated a "trap character" is stored in the memory at the location provided for the erroneous character. Upon retransmission of the message, a retransmitted character is inserted in the memory only if the retransmitted character is not detected as erroneous and if a "trap character" is stored in the memory at the location provided for the particular character. Thus, a complete error-free message will be stored in the memory so long as each character of the message is correctly received at least once during the initial transmission and subsequent retransmissions of the message.

Figure 2:
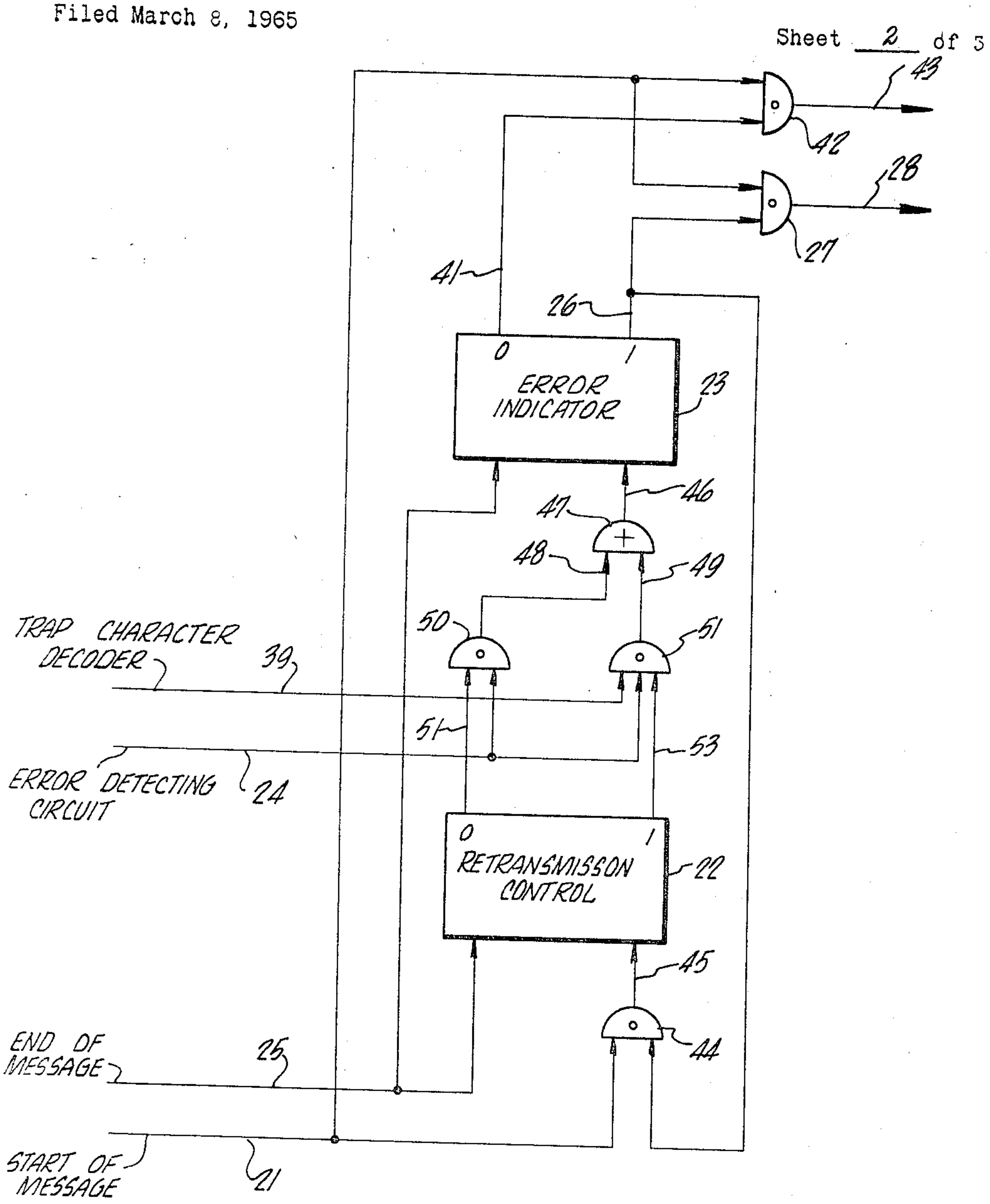
Figure 3:
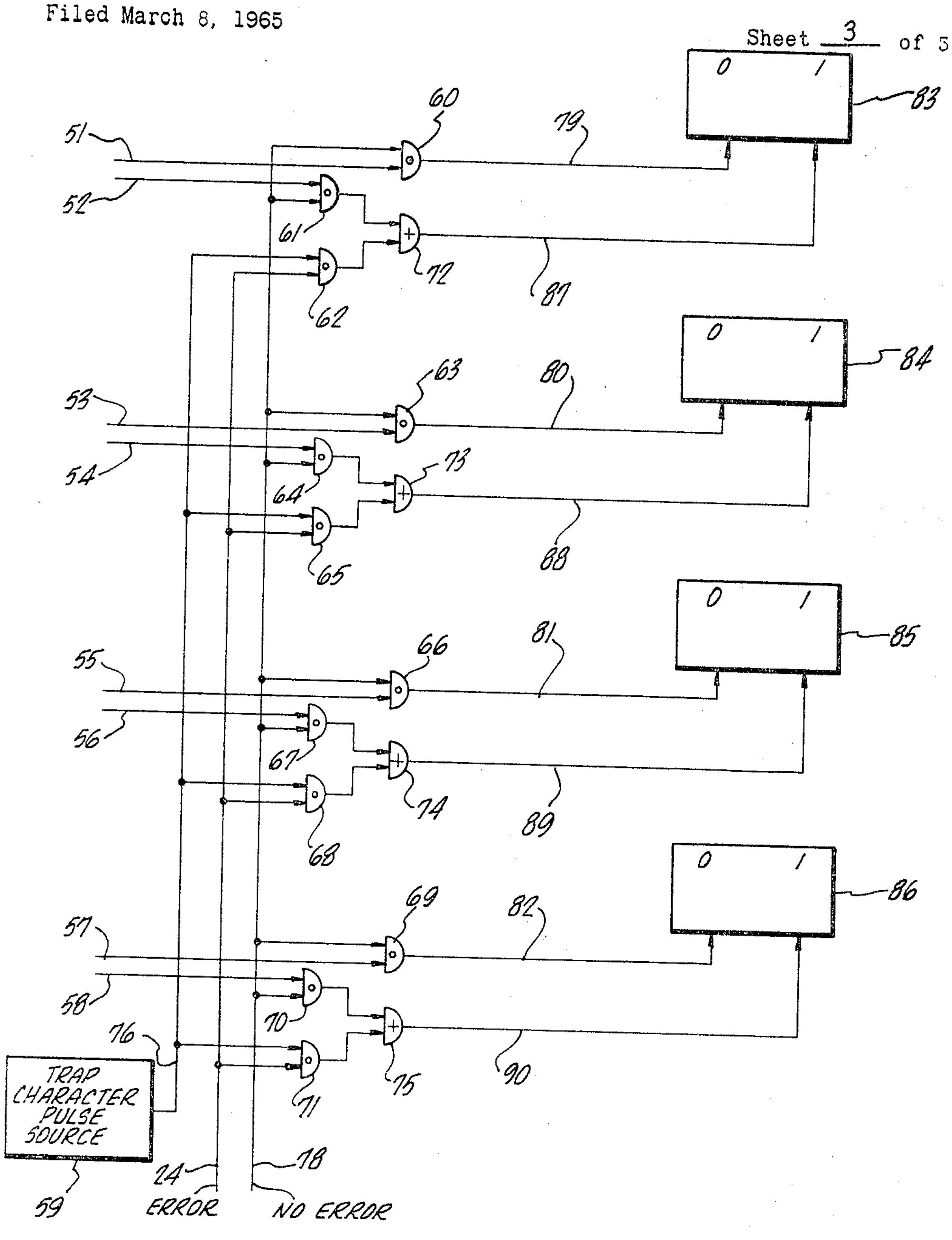

The manner of operation of the present invention and the manner in which it achieves the above and other advantages may be more clearly understood by reference to the following detailed description when considered with the drawing, in which:

FIG. 1 depicts, in block diagram form, a preferred embodiment of the present invention;

FIG. 2 depicts in detail the operation of error indicator flip-flop 23 and retransmission control flip-flop 22 shown in FIG. 1; and FIG. 3 depicts in detail the operation of the trap character formation circuit 18 shown in FIG. 1.

Input means 11 is shown in FIG. 1 as being connected by lead 12 to transmission means 13 which in turn is connected by lead 14 to input register 15. An output signal from register 15 is applied by means of lead 16 to error detection circuit 17, trap character formation circuitry 18, "end of message" decoder circuitry 19 and "start of message" decoder circuitry 20. A signal from decoder 20 is applied via lead 21 to retransmission control flip-flop 22 and to error indicator flip-flop 23. A signal from detection circuit 17 is applied via lead 24 to the trap character formation circuitry 18 and to the error indicator 23. Signals from decoder 19 and error indicator 23 are applied via leads 25 and 26, respectively, to AND gate 27 which in turn applies a signal via lead 28 to memory address register 29 and the transmission means 13. Output signals from "trap character" formation circuitry 18 and retransmission control 22 are applied via leads 30 and 31 to AND gate 32 which in turn passes a signal via lead 33 to memory information register 34. Signals on leads 25 and 41 from decoder 19 and error indicator flip-flop 23, respectively, are applied to AND gate 42 which in turn applies a signal via lead 43 to transmission means 13.

Lead 35 connects register 34 to retransmission register 36 which in turn is connected by means of lead 37 to trap character decoder 38. Output signals from decoder 38 and retransmission control 22 are applied via leads 39 and 40, respectively, along with a signal on lead 30 from circuitry 18 to AND gate 91 which in turn applies a signal to the register 34 via lead 92. Memory address register 29 is utilized in the conventional manner to write information stored in register 34 into memory 90 and alternatively to read information from memory 90 to register 34. Memory 90 and address register 29 are therefore shown in block diagram form for the purpose of illustrative clarity.

Input means 11, shown in block diagram form, can represent any well-known means for supplying information in binary digital form to transmission means 13. The transmission means 13, also shown in block diagram form, may represent any well-known means such as, for example, transmission lines for transmitting information from input means 11 to register 15. The registers 15, 34, and 36 are shown in block diagram form and may represent well-known registers in which flip-flop circuits may be utilized for the storage of information. Decoders 19, 20, and 38, shown in block diagram form, may represent well-known logic circuits capable of providing an output signal in response to the application thereto of particular input signals. Error detection circuit 17, shown in block diagram form, may represent any well-known circuit capable of detecting errors in an information character stored in register 15 such as, for example, circuitry capable of determining the parity of characters stored in register 15, and detecting parity errors in such information.

The operation of the circuitry shown in FIG. 1 will now be described. Information characters of a particular message or block of information are sequentially transmitted from input means 11 to input register 15. Transmission errors in the information received by register 15 are detected by error detection circuit 17. The start of each message is indicated by a particular character which is detected by "start of message" decoder 20. Similarly, the end of each message is indicated by a particular character which is detected by "end of message" decoder 19. Upon detection of the start of each message, decoder 20 applies a signal to error indicator flip-flop 23, which turns off this flip-flop circuit. The operation of error indicator 23 and retransmission control 22 will be described in detail hereinafter.

During the initial transmission of a message, each character stored in register 15, and not detected as erroneous by detection circuit 17, will be passed without a change by "trap character" formation circuitry 18 and transmitted via lead 30, gate 32, and lead 33 to memory information register 34. The information will be passed by gate 32 to lead 33 since at this time retransmission control flip-flop 22 will be in the OFF condition and therefore will apply a signal to lead 31. As each correct character is transmitted to memory information register 34, it will be stored in the proper location within memory 90 by the conventional operation of address register 29, information register 34, and memory 90. Each character of the message will be associated with a particular address within memory 90. Upon the receipt of an erroneous character in register 15 which is detected by error detection circuitry 17, a signal will be applied via lead 24 to error indicator flip-flop 23, turning on this flip-flop circuit as described in detail hereinafter, and to "trap character" formation circuitry 18. The operation of the circuitry 18 will also be described in detail hereinafter. As a result of the first erroneous character reaching register 15 and being detected by circuitry 17, a particular character designated a "trap character" will be passed by "trap character" formation circuitry 18 to lead 30 and thereafter passed via gate 32 and lead 33 to register 34, and subsequently stored in memory 90. Storage of this character in an address of memory 90 will indicate that the particular character which properly should have been stored in this particular location within memory 90 was erroneously received by register 15.

Subsequent characters of the initial message transmission which are correctly received by register 15 will, in a manner identical to that previously described, be correctly stored in the proper address of memory 90. Subsequent erroneously received characters will, in a manner identical to that previously described, be replaced by "trap characters" stored in addresses of memory 90 which will indicate that these particular characters were erroneously received.

The last character of the initial transmission of the message will be detected by "end of message" decoder 19 and a signal will thereby be passed via lead 25 to gate 27. At this time error indicator flip-flop 23 will be in the ON condition, representing that a character has been erroneously received during the preceding transmission, and a signal will be applied via lead 26 to gate 27. In response to the two signals applied to gate 27, a signal will be passed via lead 28 to memory address register 29 thereby resetting register 29.

As a result of this resetting operation, address register 29 will again sequentially address the locations within memory 90 in which the characters received during the preceding transmission have been stored. The characters stored in memory 90 during the previous transmission will be sequentially received in retransmission register 36 via information register 34 and lead 35. Simultaneously with this reading out of the characters stored in memory 90, the message will be retransmitted from input means 11 to register 15. Thus, whenever during the subsequent retransmission of a message the "*n*th" character of the retransmitted message is stored in register 15, the "*n*th" character of the message as previously stored in memory 90 is received by register 36.

In a duplex transmission system in which signals may be transmitted in two directions, the signal applied to lead 28 from error indicator flip-flop 23 may also be applied to transmission means 13 and transmitted via lead 12 to input means 11 thereby indicating to input means 11 that retransmission of the message is necessary.

If a simplex transmission system is utilized, the input means 11 may be designed to retransmit the message a predetermined number of times thereby to assure a high probability that a complete error-free message will be stored in memory 90 after the final retransmission.

During the first retransmission of a message in which at least one transmission error occurred during the initial transmission, the "start of message" decoder 20 will again detect the first character of the retransmitted message and will turn error indicator flip-flop 23 off and will also, as described in detail hereinafter, turn retransmission control flip-flop 22 on. As a result of retransmission control flip-flop 22 being in the ON condition, no signal will be applied via lead 31 to gate 32. Consequently, as distinguished from the initial transmission, no retransmitted character will be applied via gate 32 and lead 33 to information register 34.

As each character of the retransmitted message is received by register 15, the similarly positioned character of the message as previously stored in memory 90 is received by register 36. "Trap character" decoder 38 will apply a signal to lead 39 in response to the detection of a "trap character" in register 36. Thus, a signal will be applied to lead 39 whenever a retransmitted character is stored in register 15 which has not yet been correctly stored in memory 90.

Since retransmission control flip-flop is at this time in the ON condition, a signal is applied via lead 40 to gate 91. In response to the simultaneous application of signals to leads 39 and 40, gate 91 will pass whatever character is received via lead 30 to memory information register 34 and memory 90 via lead 92. Thus, if the particular character previously erroneously received is again erroneously received, the "trap character" will again be formed by circuitry 18 and passed via lead 30, gate 91, and lead 92 to memory 35. The detection of this erroneously received signal will again set error indicator flip-flop 23 to its ON condition as described in detail hereinafter. If, however, the character previously received incorrectly is correctly received during the retransmission, the correct character will be transmitted via lead 30, gate 91, and lead 92 to memory information register 34 and memory 90.

If at the end of the first retransmission, all characters which were incorrectly received during the initial transmission, are correctly received, the error indicator flip-flop 23 will remain in the OFF condition and upon receipt of the "end of message" signal from decoder 19, signals will be applied via leads 41 and 25 to gate 42, and thence to transmission means 13 via lead 43. If, however, at least one character received incorrectly during the initial transmission is again received incorrectly, error indicator flip-flop 23 will be in the ON condition at the end of the retransmitted message and a signal will be again applied via gate 27 and lead 28 to reset address register 29.

As stated previously, if a duplex transmission system is utilized, a signal on lead 28 may again be applied to transmission means 13 and thence transmitted via lead 12 to input means 11 thereby indicating that another retransmission is called for. If a duplex transmission system is utilized and all characters incorrectly received during the initial transmission were correctly received, the signal applied to the transmission means 13 via lead 43 may be transmitted to input means 11 via lead 12 thereby indicating to input means 11 that it may proceed with the initial transmission of a succeeding message.

If, on the other hand, a simplex transmission system is utilized and an error-free message is stored in memory 90 at the end of the initial transmission or subsequent retransmission, the signal applied via leads 41 and 25, gate 42, and lead 43 to transmission means 13 may be utilized to disconnect input register 15 from transmission means 13. Since input means 11 will continue to retransmit the particular message a predetermined number of times, there is no need to retransmit these characters to register 15 after an error-free message has been recorded in memory 90. As a result, memory 90, which may advantageously be the main memory of a data processor of which the circuitry of FIG. 1 is a part, may be made solely available to other elements of the processor after register 15 and input means 11 are disconnected. Alternatively, input register 15 could be reconnected to another input means after the signal from input means 11 has been correctly stored in memory 90.

FIG. 2 depicts in detail the operation of error indicator flip-flop 23 and retransmission control flip-flop 22 shown in FIG. 1. Elements appearing in FIG. 2 which also appear in FIG. 1 are indicated by the same reference characters utilized in FIG. 1. It can be seen from FIG. 2 that retransmission control flip-flop 22 is set to its OFF condition by an "end of message" signal appearing on lead 25 from decoder 19. Retransmission control flip-flop 22 is set to its ON condition by the simultaneous application of a "start of message" signal from decoder 20 on lead 21 to gate 44 and a signal from error indicator flip-flop 23 via lead 26 to gate 44. In response to these two signals, gate 44 will pass a signal to lead 45 thereby setting retransmission control flip-flop 22 to its ON condition.

It may also be seen that eror indicator flip-flop 22 will be set to its OFF condition by a "start of message" signal on lead 21 from decoder 20 and will be turned on by a signal applied to lead 46 via OR gate 47 in response to a signal upon either of leads 48 and 49. A signal will be passed to lead 48 via AND gate 50 in response to the simultaneous applications of signals on lead 51 in response to retransmission control 22 being in the OFF condition, and on lead 24 from error detecting circuit 17. A signal will be applied to lead 49 via gate 51 in response to the simultaneous application of signals to lead 53 when retransmission control flip-flop 22 is in the ON condition, to lead 39 from trap character decoder 38 and on lead 24 from error detecting circuit 17. Gates 27 and 42, shown in FIG. 1, are also shown in FIG. 2.

Prior to the initial transmission of a message both retransmission control flip-flop 22 and error indicator flip-flop 23 are in the OFF condition. As described previously in the discussion of the circuit of FIG. 1, characters received correctly during the initial transmission will be passed by "trap character" formation circuitry 18 of FIG. 1 to memory information register 34 via leads 30 and 33, and gate 32. These characters will be passed by gate 32 since retransmission control flip-flop 22 will present a signal to lead 31 when this flip-flop is in the OFF condition. Upon the detection of an erroneous character, however, error detection circuit 17 will present a signal to lead 24 as described previously. As shown in FIG. 2, the signal on lead 24 and a signal presented by flip-flop 22 to lead 51 will present a signal to lead 46 via gates 47 and 50 and lead 48 and this signal on lead 46 will switch error indicator flip-flop 23 to its ON condition. Error indicator flip-flop 23 being in the ON condition will thereafter indicate at the end of the initial message transmission that an error has occurred during the initial transmission and that a subsequent transmission will be necessary. This is indicated by means of signals presented to gate 27 by leads 26 and 25 from error indicator 23 and "end of message" decoder 25, respectively. In response to these two signals gate 27 will pass a signal to lead 28 which, as described previously, will reset memory address register 29 thereby preparing it for the subsequent message retransmission.

During the subsequent retransmission, the "start of message" signal appearing on lead 21 will reset error indicator 23 to its OFF condition and will, in conjunction with a signal on lead 26 from error indicator 23, set retransmission control flip-flop 22 to its ON condition. The setting of retransmission control 22 to its ON condition will, as described previously, limit access to memory information register 34 to those retransmitted characters which were erroneously received during previous transmissions.

Error indicator flip-flop 23 will be set to its ON condition during retransmission of the message only if a particular character erroneously transmitted during previous transmissions is again erroneously transmitted. This occurs in response to simultaneous signals applied to gate 51 on lead 39 from trap character decoder 38, on lead 24 from error detection circuit 17, and on lead 53 from retransmission control flip-flop 22. A signal is present on lead 53 only during retransmissions of the message. A signal is present on lead 39 only if the character in a particular message position has not yet been correctly transmitted and a signal is present on lead 24 only if the retransmitted character in this particular message position has been erroneously transmitted. In response to these three signals, a signal is passed via gate 51, lead 49, gate 47, and lead 46 to error indicator flip-flop 23 thereby setting this flip-flop to its ON condition indicating that a subsequent retransmission will again be necessary.

If, however, during retransmission of the message all characters previously transmitted erroneously are correctly transmitted, the correct characters will be stored in memory 35 are discussed in connection with the circuit shown in FIG. 1 and at the end of the retransmission of the message, error indicator flip-flop 23 will still be in the OFF condition. As a result, a signal on lead 25 from the "end of message" decoder 19 and a signal on lead 41 from error indicator flip-flop 23 both applied to gate 42 will pass a signal to lead 43. As discussed previously this signal on lead 43 may advantageously be utilized to disconnect the error correction circuitry of FIG. 1 from transmission means 13 when a simplex transmission system is utilized, or to indicate that the initial transmission of a succeeding message may commence if a duplex transmission system is utilized.

FIG. 3 depicts in detail the operation of the trap character formation circuitry 18 shown in FIG. 1. For the sake of illustrative clarity a single lead 16 is shown in FIG. 1 as connecting input register 15 to trap character formation circuitry 18. However, since message characters are stored in register 15 by means of flip-flop circuits, there will be two output leads from each of these flip-flop circuits connected to circuitry 18 indicative of the particular information stored in register 15. Similarly, output lead 30 from "trap character" formation circuitry 18 and leads 33 and 42, all shown in FIG. 1, are shown for the sake of illustrative clarity as single leads. However, since these leads are utilized to transmit either the character stored in register 15 or a "trap character" to input register 34 and since memory information register 34 will compirse a number of flip-flop circuits equal to the number of binary digits in each such character, they too will actually consist of a number of leads such that there are two leads associated with each flip-flop of register 34.

FIG. 3 shows input leads 51, 52, 53, 54, 55, 56, 57, and 58 from input register 15. These leads are associated with four of the flip-flop circuits in register 15. Additional flip-flop circuits in register 15 would also each have two output leads associated therewith which would be connected to "trap character" formation circuitry 18 and information register 34 in a manner similar to that shown in FIG. 3 for the leads 51–58.

"Trap character" formation circuitry 18 of FIG. 1 is shown in FIG. 3 as comprising "trap character" pulse source 59, AND gates 60, 61, 62, 63, 64, 65, 66, 67, 68, 70, and 71, OR gates 72, 73, 74, and 75, and leads connected therebetween as shown in FIG. 3.

An output lead from source 59 is applied via lead 76 to the AND gates 62, 65, 68, and 71. Lead 24, also shown in FIG. 1, has a signal applied thereto whenever error detection circuit 17 determines that the character stored in register 15 has been incorrectly transmitted, and is connected to gates 62, 65, 68, and 71. Lead 78 has a signal applied thereto whenever error detection circuitry 17 determines that the character stored in register 15 has been correctly transmitted and is connected to gates 60, 61, 63, 64, 66, 67, 69, and 70. For the sake of clarity only the output lead 24 was shown from detection circuit 17 in FIG. 1, and lead 78, indicative of a correct transmission, was not shown.

The input leads 51–58 are shown connected to gates 60, 61, 63, 64, 66, 67, 69, and 70, respectively. Leads 79, 80, 81, and 82 from gates 60, 63, 66, and 69, respectively, are shown connected to flip-flop circuits 83, 84, 85, and 86, respectively. These flip-flop circuits are four of the flip-flops of memory information register 34 shown in FIG. 1 and signals applied to leads 79–82 are effective to set respective ones of these flip-flop circuits to their OFF condition. Leads 87, 88, 89 and 90 from OR gates 72, 73, 74, and 75, respectively, are also connected to respective ones of the flip-flop circuits 83–86 and signals applied to these leads are effective to set respective ones of these flip-flop circuits to their ON condition.

It may be seen that a signal applied to lead 78 indicative of correct transmission of a character stored in register 15 will enable the signals on leads 51–58 to set flip-flops 83–86 into conditions also representative of the correctly transmitted character stored in register 15. Thus, a first flip-flop circuit in register 15 which is in its OFF condition will transmit a signal via lead 51 which will be passed by gate 60 to lead 79 and will be effective to set the first flip-flop circuit 83 of register 34 also to its OFF condition. Similarly, if the third flip-flop circuit register 15 is in its ON condition, a signal will be applied to lead 56 and passed by gates 67 and 74 to lead 89 and will set the third flip-flop circuit 85 of register 34 to its ON condition. Similarly, each of the remaining flip-flop circuits of register 34 is set to the same condition as its corresponding flip-flop circuit in register 15.

If, however, a signal on lead 24 indicative of the detection of an error by detection circuitry 17 is applied to the gates 62, 65, 68, and 71, none of the signals applied to input leads 51–58 will be passed to the flip-flop circuits of register 34. Rather, signals from pulse source 59 applied to lead 76 will, in conjunction with the signal on lead 24, pass a signal via gates 62 and 72 to lead 87, via gates 65 and 73 to lead 88, via gates 68 and 74 to lead 89, and via gates 71 and 75 to lead 90, which signals will set all of the flip-flop circuits of register 34 to their ON condition. The setting of all of these registers to their ON condition will be representative of a "trap character" and will indicate erroneous transmission of the characters stored in register 15. As described previously, memory address register 29, memory information register 34 and memory 90 will operate in a conventional manner whereby each character or "trap character" temporarily stored in register 34 will thereafter be stored in a location within memory 90 indicative of the message position of that particular character.

The present invention, as described, assures that a correct message will be stored in memory 90 after a number of retransmissions of that message so long as each character has been correctly transmitted at least once during any of the transmissions. If a duplex transmission system is used, any error occurring during the initial transmission or any error occurring during subsequent retransmissions of a character not yet correctly transmitted will set error indicator flip-flop 23 to its ON condition thereby indicating that another retransmission is necesary. This indication may be transmitted via lead 28 to transmission means 13, thence to input means 11 via lead 12 thereby indicating to input means 11 that another retransmission of the message is necessary. If, on the other hand, a simplex transmission system is used and a complete error-free message has not been stored in memory 90 at the completion of the final retransmission of the message, memory 90 will have stored therein at least one "trap character" within the message. Storage of this "trap character," however, may be preferable to the storage of the incorrectly transmitted character received by register 15. Thus, during subsequent utilization of this message by a data processor of which memory 90 is a part, the data processor will be able to determine from the "trap character" that this particular error occurred as a result of erroneous transmission rather than as a result of some erroneous operation within the data processor itself.

What have been described are considered to be only illustrative embodiments of the present invention and, accordingly, it is to be understood that various and numerous other arrangements may be devised by one skilled in the art without departing from the spirit and scope of this invention.

What is claimed is:

1. A data transmission system comprising:

transmission means for delivering a sequence of information representative characters to a first register, each character comprising a plurality of binary digits, the transmission means delivering the sequence of characters to the register a plurality of times, means for detecting errors in characters stored in the first register, means for generating a particular error-representative character in response to detection of an erroneous character stored in the register, memory means having a plurality of addresses for the storage of binary digital information therein, each character of the sequence being associated with a particular address of the memory, means operative during the initial delivery of the sequence of characters for storing correctly received characters in their associated addresses of the memory and for storing the error-representative character in each address whose associated character has been detected as erroneous, and means operative during subsequent deliveries of the sequence of characters and responsive to error-representative characters previously stored in the memory for storing, in their associated memory addresses, those correctly received characters which were theretofore incorrectly received.

2. A data transmission system according to claim 1 in which the last mentioned means for storing characters correctly received during subsequent deliveries which were theretofore incorrectly received comprises:

means for sequentially reading from the memory each character stored in the memory address associated with the sequence of characters and storing these characters in a second register, each character being read from its associated memory address and stored in the second register while the redelivered character associated with the same memory address is stored in the first register, means for detecting the particular error-representative character stored in the second register, and means responsive to detection of the particular error-representative character in the second register for storing in its associated memory address the character then stored in the first register.

3. A data transmission system comprising:

transmission means for delivering a sequence of information representative characters to a first register, each character comprising a plurality of binary digits, means for detecting errors in characters stored in the register, means for generating a particular error-representative character in response to detection of an erroneous characte stored in the first register, memory means having a plurality of addresses for the storage of binary digital information therein, each character of the sequence being associated with a particular address of the memory, means for storing correctly received characters in their associated addresses of the memory and for storing the error-representative character in each address whose associated character has been detected as erroneous, means responsive to detction of an erroneous character stored in the first register for effectuating a second delivery of the sequence of characters, and means operative during the second delivery of the sequence of characters and responsive to error-representative characters stored in the memory during the initial delivery for storing in their associated memory locations those correctly received characters which were incorrectly received during the initial delivery.

4. A data transmission system according to claim 3 in which the last mentioned means for storing characters correctly received during the second delivery which were incorrectly received during the initial delivery comprises:

means for sequentially reading from the memory each character stored in the memory addresses associated with the sequence of characters and storing these characters in a second register, each character being read from its associated memory address and stored in the second register while the redelivered character associated with the same memory address is stored in the first register, means for detecting the particular error-representative character stored in the second register, and means responsive to detection of the particular error-representative character in the second register for storing in its associated memory address the character then stored in the first register.

5. A data transmission system comprising:

transmission means for delivering a sequence of information representative characters to a first register, each character comprising a plurality of binary digits, the complete sequence being transmitted to the register a predetermined number of times, means for detecting errors in characters stored in the register, means for generating a particular error-representative character in response to detection of an erroneous character stored in the first register, memory means having a plurality of addresses for the storage of binary digital information therein, each character of the sequence being associated with a particular address of the memory, means for storing characters correctly received during the initial transmission in their associated memory addresses and for storing the error-representative character in the addresses of those characters incorrectly received during the initial transmission, means operative during subsequent transmissions for sequentially reading from the memory addresses associated with the sequence of characters the characters stored therein and storing these characters in a second register, each character being read from its associated memory address and stored in the second address while the retransmitted character associated with the same memory address is stored in the first register, means for detecting the particular error-representative character stored in the second register, and means responsive to detection of the particular error-representative character in the second register for storing in its associated memory address the character then stored in the first register.

6. A data transmission system according to claim 5 further comprising:

means for determining the storage of correctly received characters in all memory address associated with the sequence of characters, and means responsive to the determination of the storage of correctly received characters in all of these memory addresses for disconnecting the first register from the transmission means.

7. A data transmission system comprising:

transmission means for delivering a first sequence of information representative characters to a first register, each character comprising a plurality of binary digits, means for detecting errors in characters stored in the first register, means for generating a particular error-representative character in response to detection of an erroneous character stored in the first register, memory means having a plurality of addresses for the storage of binary digital information therein, each character of the first sequence being associated with a particular address of the memory, means for storing correctly received characters in their associated addresses of the memory and for storing the error-representative character in each address whose associated character has been detected as erroneous, means responsive to detection of an erroneous character stored in the first register for effectuating a retransmission of the first sequence of characters whenever the detected character has not yet been correctly stored in its associated address of the memory, means for sequentially reading from the memory each character stored in the memory addresses associated with the first sequence of characters and storing these characters in a second register, each character being read from its associated memory address and stored in the second address while the retransmitted character associated with the same memory address is stored in the first register, means for detecting the particular error-representative character stored in the second register, and means responsive to detection of the particular error-representative character in the second register for storing in its associated memory address the character then stored in the first register.

8. A data transmission system according to claim 7 further comprising:

means responsive to the transmission of the entire first sequence of characters without detection of the storage in the first register of an erroneous character not yet correctly stored in the memory, for enabling the transmission means to deliver a second sequence of information representative characters to the first register.

9. A method of correcting errors occurring during transmission of a sequence of information representative characters each of which includes a plurality of binary digits comprising:

sequentially transmitting the characters to a first register, detecting errors in characters stored in the first register, generating a particular error-representative character in response to detection of an erroneous character stored in the first register, storing correctly transmitted characters in a memory means having a plurality of addresses for the storage of binary digital information therein, each character of the sequence being associated with a particular address of the memory, the correctly transmitted characters being stored in their associated addresses, storing the error-representative character in each memory address associated with an incorrectly transmitted character, sequentially retransmitting the characters to the first register a predetermined number of times, sequentially reading from the memory addresses during retransmissions the characters stored therein, storing each character read from its associated memory address in a second register at the same time the retransmitted character associated with the same memory address is stored in the first register, detecting the particular error-representative character stored in the second register, and storing in its associated memory address, upon detection of the error-representative character stored in the second register, the character then stored in the first register.

10. A method of correcting errors occurring during transmission of sequences of information representative characters each of which includes a plurality of binary digits comprising:

transmitting a first sequence of information representative characters to a first register, detecting errors in characters stored in the first register, generating a particular error-representative character in response to detection of an erroneous character stored in the first register, storing correctly transmitted characters in a memory means having a plurality of addresses for the storage of binary digital information therein, each character of the first sequence being associated with a particular address of the memory, the correctly transmitted characters being stored in their associated addresses, storing the error-representative character in each memory address associated with an incorrectly transmitted character, retransmitting the first sequence of characters upon detection of an erroneous character stored in the first register whenever the detected character has not yet been correctly stored in its associated memory address, sequentially reading from the memory addresses, during any retransmission of the first sequence of characters, the characters stored therein, storing each character read from its associated memory address in a second register at the same time that the retransmitted character associated with the same memory address is stored in the first register, detecting the particular error-representative character stored in the second register, storing in its associated memory address, upon detection of the error-representative character being stored in the second register, the character then stored in the first register, and transmitting a second sequence of information representative characters to the first register in response to the transmission of the entire first sequence of characters without detection of the storage in the first register of an erroneous character not yet correctly stored in the memory.

References Cited

UNITED STATES PATENTS

| | | | |
|---|---|---|---|
| 3,154,638 | 10/1964 | Van Dalen | 340—146.1 X |
| 3,222,653 | 12/1965 | Rice | 340—146.1 X |
| 3,252,138 | 5/1966 | Young | 340—146.1 |
| 3,273,120 | 9/1966 | Dustin et al. | 340—146.1 |
| 3,350,690 | 10/1967 | Rice | 340—146.1 |

MALCOLM A. MORRISON, *Primary Examiner.*

C. A. ATKINSON, *Assistant Examiner.*

U.S. Cl. X.R.

235—153